(12) United States Patent
Kelly et al.

(10) Patent No.: US 8,484,131 B2
(45) Date of Patent: *Jul. 9, 2013

(54) METHODS AND SYSTEMS FOR PROCESSING A FINANCIAL TRANSACTION

(75) Inventors: Mary L. Kelly, St. Louis, MO (US); Terry Altman, St. Peters, MO (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/213,875

(22) Filed: Aug. 19, 2011

(65) Prior Publication Data

US 2011/0302082 A1 Dec. 8, 2011

Related U.S. Application Data

(63) Continuation of application No. 12/182,883, filed on Jul. 30, 2008, now Pat. No. 8,027,890.

(60) Provisional application No. 60/953,847, filed on Aug. 3, 2007.

(51) Int. Cl.
*G06Q 40/00* (2012.01)

(52) U.S. Cl.
USPC .................. 705/40; 705/30; 705/35; 705/39; 705/45

(58) Field of Classification Search
USPC .......................... 705/40, 30, 35, 39
See application file for complete search history.

(56) References Cited

U.S. PATENT DOCUMENTS

| | | | |
|---|---|---|---|
| 5,383,113 A | 1/1995 | Kight et al. |
| 5,699,528 A | 12/1997 | Hogan |
| 5,873,072 A | 2/1999 | Kight et al. |
| 5,878,215 A | 3/1999 | Kling et al. |
| 6,052,671 A | 4/2000 | Crooks et al. |
| 6,408,284 B1 | 6/2002 | Hilt et al. |
| 6,932,268 B1 | 8/2005 | McCoy et al. |
| 6,996,542 B1 | 2/2006 | Landry |
| 7,076,458 B2 | 7/2006 | Lawlor et al. |
| 7,107,244 B2 | 9/2006 | Kight et al. |
| 7,117,171 B1 | 10/2006 | Pollin |
| 7,120,602 B2 | 10/2006 | Kitchen et al. |
| 7,146,338 B2 | 12/2006 | Kight et al. |
| 7,177,830 B2 | 2/2007 | Shields et al. |
| 7,200,551 B1 | 4/2007 | Senez |
| 7,225,155 B1 | 5/2007 | Polk |
| 7,240,028 B1 | 7/2007 | Rugge |
| 7,240,031 B1 | 7/2007 | Kight et al. |
| 2002/0013768 A1 | 1/2002 | Ganesan |
| 2002/0198835 A1 | 12/2002 | Watson |
| 2005/0137972 A1 | 6/2005 | Krumlauf |
| 2006/0095367 A1 | 5/2006 | Iverson |
| 2006/0229978 A1 | 10/2006 | Popovic et al. |
| 2009/0263004 A1 | 10/2009 | Hawkins et al. |

OTHER PUBLICATIONS

International Search Report and Written Opinion; PCT/US2008/71924 dated Oct. 16, 2008; 10 pages.

*Primary Examiner* — Vanel Frenel
(74) *Attorney, Agent, or Firm* — Armstrong Teasdale LLP (57) ABSTRACT

A method for processing a financial transaction such as an electronic bill payment is provided. The method includes receiving an electronic bill payment wherein the bill payment is submitted on behalf of a consumer in response to a bill associated with a biller, determining using a computer system that the received electronic bill payment is an exception payment wherein the exception payment includes the electronic bill payment submitted by the consumer having consumer entered information not matching a criterion for accepting electronic payment required by the biller, creating an exception addenda record for the exception payment using data stored within a database wherein the addenda record identifies the consumer submitting the exception payment, and posting the exception payment to an appropriate consumer account for the biller based on the addenda record.

12 Claims, 7 Drawing Sheets

METHODS AND SYSTEMS FOR PROCESSING A FINANCIAL TRANSACTION

CROSS REFERENCE TO RELATED APPLICATIONS

This application is a continuation application of patent application Ser. No. 12/182,883 filed on Jul. 30, 2008, now U.S. Pat. No. 8,027,890 which claims the priority of Provisional patent Application Ser. No. 60/953,847 filed on Aug. 3, 2007, which are both hereby incorporated by reference in their entirety.

BACKGROUND OF THE INVENTION

This invention relates generally to a financial transaction system and method, and more particularly to a computerized bill payment system for electronically processing an exception item included within the financial transaction to affect bill payment.

Today, most households spend a significant amount of time each month responding to numerous bills including utility bills, credit card bills, mortgage payments, car loan payments, insurance payments, etc. Traditionally, the bill payment transaction cycle includes the following steps: (a) generation of a bill by a biller; (b) mailing the bill to the customer; (c) customer writing a check for the invoiced amount and mailing the check along with a remittance slip to the biller; (d) biller manually depositing the check in their bank account; and (e) biller crediting customer's account and check clearing (i.e., physically sending the check to the customer's bank and sufficient funds in customer's bank account being identified and debited). This method is labor intensive and time consuming for a bill-payer, and must be done on multiple occasions each month since the bills do not normally arrive or become due on the same date. In addition, the bill-payer has to absorb the costs of postage in mailing the paper checks to payees. Paper checks processing also entails significant costs to the payees who receive and handle remittances in this manner.

Attempts have been made to improve the efficiency of the bill payment process. As a service to customers, some banks have made arrangements with designated payees to accept payment of invoices received in the mail by bank customers directly through the bank. A customer can bring their mailed bill to the bank and have a teller process the bill by debiting the customer's account and processing a credit to the biller which may be deposited in a biller's account with the bank or electronically transferred to an account in another bank used by the biller. The electronic transfer typically takes place over a data network interconnecting the two financial institutions. The remittance slip received from the client is then mailed to the biller, so that it can be reconciled with the mailed invoice.

At least one other automated bill payment process includes a computerized payment system through which a consumer may instruct a server by telephone, computer terminal or other telecommunications device to pay bills without having to write a check. In this system, a bill is received from a merchant in hard copy form and the consumer is able to make payment to the merchant through a centralized server coupled to a network. The payment system allows a consumer to establish a list of merchants to be paid, along with details regarding the financial institution from which funds are to be drawn for payment. To affect payment, a consumer contacts the server and enters payment instructions. Debiting and crediting of payments from financial institutions and merchants respectively is then facilitated by electronic funds transfer or paper check. In this system, bill information is not uploaded to the server. This system does not completely eliminate the generation of hard copies of bills from merchants or the processing of paper checks for merchant payment.

An additional example of an automated bill payment system includes a bill delivery and payment system which allows users to access a server via the Internet to facilitate bill payment. Using a personal computer, a user can view bill information and instruct the server regarding payment instructions. Bill information is uploaded from billers to the server for display to users. After a user has entered payment information, the user's bank account is debited and the biller is credited automatically.

None of these known automated bill payment systems are able to electronically process exception payments. In some known cases, payments that originate by a bill payment service provider may be fulfilled either via an electronic transaction or via a paper check. The primary method used to determine whether a bill payment is fulfilled electronically or via paper check is based on the data the consumer enters for the payment. If the data entered for payment matches the billing data (e.g., account structure, account length, remittance address, check-digit routine) provided by a biller, then the payment can be fulfilled electronically. If the data does not match, an originator will create a paper check containing the consumer entered data for the payment method. This creates an "exception item" for the biller as this payment will be sent without supporting remittance information (e.g., payment coupon, remittance advice, payment stub) to process through the biller's lockbox system. The biller must manually research and post the resulting exception item. Originators prefer to fulfill transactions electronically for several reasons including it is a lower cost fulfillment method, and the payment is posted more quickly if it is fulfilled electronically, which leads to greater customer satisfaction. Billers prefer electronic remittance as it reduces the time that sales are outstanding, improves their cash flow and increases customer satisfaction.

Accordingly, a system and method for electronically processing financial transactions that include an exception item to affect payment of a bill is needed, wherein an exception item includes, for example, a situation where data entered by the consumer for payment does not match the billing data provided by the biller, and wherein an exception payment typically results in a check being manually generated and processed.

BRIEF DESCRIPTION OF THE INVENTION

In one aspect, a method for processing an electronic bill payment using a computer system coupled to a database is provided. The method includes receiving an electronic bill payment wherein the bill payment is submitted on behalf of a consumer in response to a bill associated with a biller, determining using the computer system that the received electronic bill payment is an exception payment wherein the exception payment includes the electronic bill payment submitted by the consumer having consumer entered information not matching a criterion for accepting electronic payment required by the biller, creating an exception addenda record for the exception payment using data stored within the database wherein the addenda record identifies the consumer submitting the exception payment, and posting the exception payment to an appropriate consumer account for the biller based on the addenda record.

In another aspect, a computer coupled to a database for processing an electronic bill payment is provided. The computer is programmed to receive an electronic bill payment submitted on behalf of a consumer in response to a bill associated with a biller, determine that the received electronic bill payment is an exception payment wherein the exception payment includes the electronic bill payment submitted by the consumer having consumer entered information not matching a criterion for accepting electronic payment required by the biller, create an exception addenda record for the exception payment using data stored within the database wherein the addenda record identifies the consumer submitting the exception payment, and post the exception payment to an appropriate consumer account for the biller based on the addenda record.

In another aspect, a system for processing an electronic bill payment is provided. The system includes a client system comprising a browser, a database for storing information, and a server system configured to be coupled to the client system and the database. The server is further configured to receive from the client system an electronic bill payment submitted on behalf of a consumer in response to a bill associated with a biller, determine that the received electronic bill payment is an exception payment wherein the exception payment includes the electronic bill payment submitted by the consumer having consumer entered information not matching a criterion for accepting electronic payment required by the biller, create an exception addenda record for the exception payment using data stored within the database wherein the addenda record identifies the consumer submitting the exception payment, and post the exception payment to an appropriate consumer account for the biller based on the addenda record.

In another aspect, a system for processing an electronic bill payment is provided. The system includes a plurality of client systems comprising an originator computer and a biller computer, a database for storing information, and a server system configured to be coupled to the plurality of client systems and the database. The originator computer is configured to receive an electronic bill payment submitted on behalf of a consumer in response to a bill associated with a biller wherein the bill payment includes bill payment information entered on behalf of the consumer, receive information from the server system including biller directory information provided by the biller wherein the biller directory information includes consumer account information for the consumer, biller information and an exception mask, compare the bill payment information entered on behalf of the consumer to the consumer account information, determine that the bill payment information does not match the consumer account information for the consumer, determine that the bill payment information entered on behalf of the consumer satisfies the corresponding exception mask, and designate the bill payment submitted on behalf of the consumer as an exception payment wherein the exception payment includes the electronic bill payment submitted by the consumer having consumer entered information not matching a criterion for accepting electronic payment required by the biller. The originator computer is further configured to create an exception payment data file with an addenda record for the exception payment wherein the data file includes at least one of a name of the consumer, an address for the consumer, a telephone number for the consumer, and a consumer identifier, and transmit the exception payment data file to the server system for further processing.

In another aspect, a computer program embodied on a computer readable medium for processing an electronic bill payment is provided. The program includes at least one code segment for instructing a computer to receive an electronic bill payment submitted on behalf of a consumer in response to a bill associated with a biller, determine that the received electronic bill payment is an exception payment wherein the exception payment includes the electronic bill payment submitted by the consumer having consumer entered information not matching a criterion for accepting electronic payment required by the biller, create an exception addenda record for the exception payment using data stored within a database wherein the addenda record identifies the consumer submitting the exception payment, and post the exception payment to an appropriate consumer account for the biller based on the addenda record.

In another aspect, a method for electronically processing a financial transaction including an exception payment is provided. The exception payment includes payments made by a consumer using an on-line computer system wherein consumer entered information does not match a criterion provided by a corresponding biller for accepting electronic payment. The method uses a computer system coupled to a database. The method includes (a) providing originators with an option of sending exception payments electronically for faster posting and receipt of funds; (b) providing billers with an option of receiving exception payments electronically for faster posting and receipt of funds; (c) storing the billers choosing to receive exception payments electronically and associated exception masks, if applicable, for use with exception payments; (d) determining by an originator whether an electronic bill payment entered by a consumer is an exception payment, and whether a corresponding exception mask is satisfied; (e) creating an exception data file including an exception addenda record to the exception payment including at least one of the consumer's first name, consumer's address, consumer's telephone number, and consumer identifier; (f) transmitting the exception payment along with the corresponding exception addenda record to at least one of the biller and biller service provider; (g) matching the received exception payment and corresponding exception addenda record to consumer data stored for the biller; (h) posting the exception payment for the biller; (i) creating for the biller a non-financial return with an addenda record which contains corrected account information; (j) transmitting the non-financial return with the addenda record to the originator to update their files to correct future recurring payments by the consumer; and (k) updating the consumer payment information with the correct account number by the originator.

In another aspect, a network-based system for electronically processing a financial transaction including an exception payment is provided. The system includes a client system comprising a browser, a centralized database for storing consumer related information, and a server system configured to be coupled to the client system and the database. The server is further configured to (a) prompt an originator to elect to send exception payments electronically for faster posting and receipt of funds; (b) prompt a biller to elect to receive exception payments electronically for faster posting and receipt of funds; (c) store the billers electing to receive exception payments electronically in the database and associated exception masks, if applicable, for use with exception payments; (d) determine by an originator whether an electronic bill payment entered by a consumer is an exception payment, and whether a corresponding exception mask is satisfied; (e) generate and apply an exception data file including an exception addenda record to the exception payment including at least one of the consumer's first name, consumer's address, consumer's telephone number, and consumer identifier; (f) transmit the exception payment along with the corresponding exception addenda record to at least one of the biller and biller service provider; (g) match the received exception payment and corresponding exception addenda record to consumer data stored for the biller; (h) post the exception payment for the biller; (i) create for the biller a non-financial return with an addenda record which contains corrected account information; (j) transmit the non-financial return with the addenda record to the originator to update their files to correct future recurring payments by the consumer; and (k) update the consumer payment information with the correct account number by the originator.

In another aspect, a computer and a computer program are provided, which are configured or programmed to perform steps similar to those recited herein.

DETAILED DESCRIPTION OF THE INVENTION

Figure 1A:
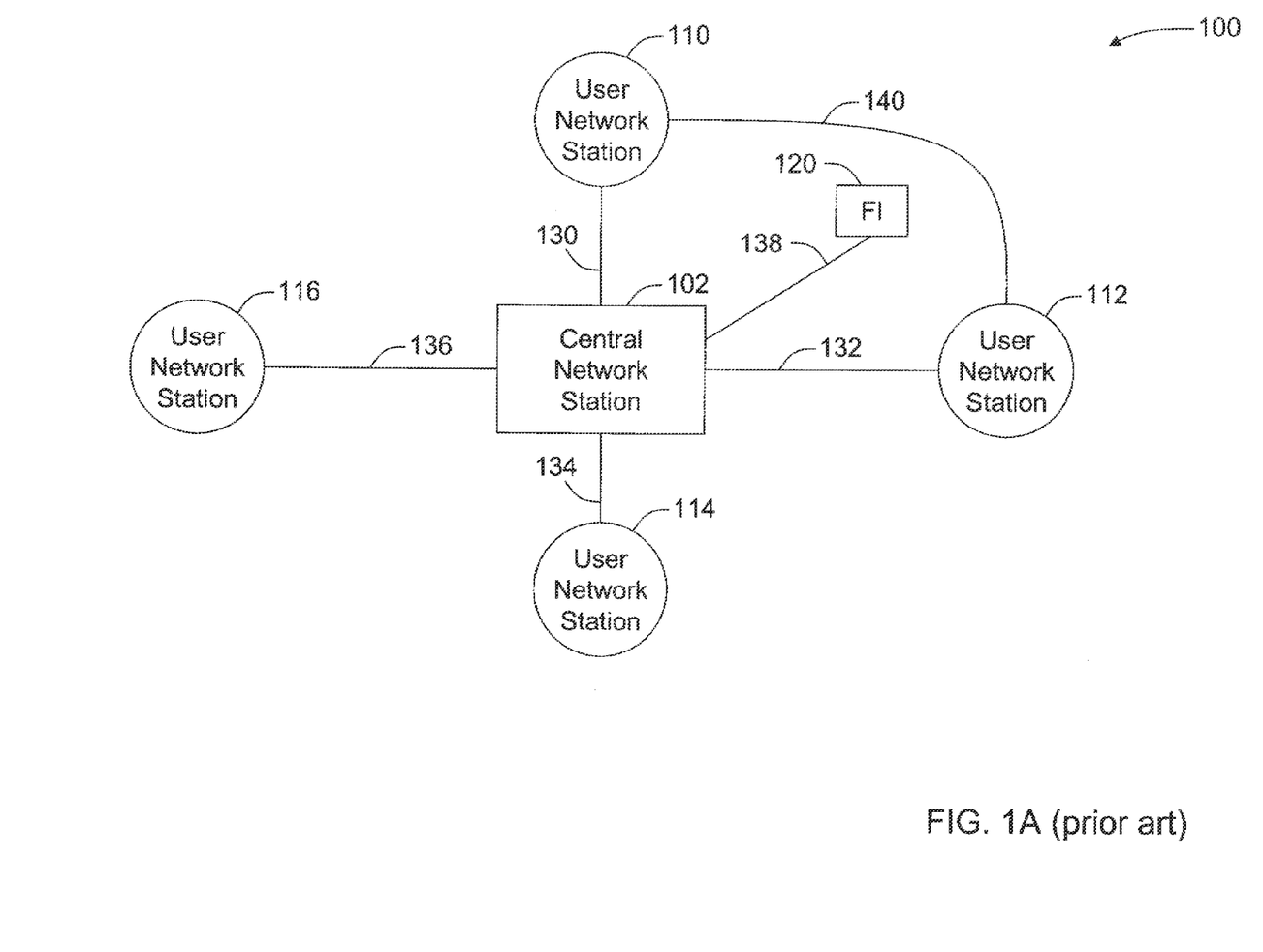
FIG. 1A is a simplified block diagram of a conventional electronic financial service system.

FIG. 1A is a generalized exemplary depiction of a conventional electronic financial service network 100. In a most basic form, such a network typically comprises a central network station 102 in communication with multiple user network stations 110, 112, 114, 116. Network users, who are customers of the financial service network 100, direct the central network station 102 to perform or facilitate financial transactions and/or services on their behalf. These directions are made via user network stations 110-116. A user network station is typically a personal computer, though it could be another type device. Another type device could be, but is not limited to, a telephone, a personal digital assistant, a set top box, or a computing device even more powerful than a personal computer. The financial transactions and services typically include, but are not limited to, bill and/or invoice presentment, bill and/or invoice payment, investment services, person-to-person payments, transmissions of financial information, home banking transactions, and purchase transactions. The central network station 102 conventionally maintains a central repository of information relating to services and transactions performed and/or facilitated and disseminates portions of this information to and between respective participants in the network 100, including those associated with user network stations 110-116 as well as other participants to be discussed below. In providing and/or facilitating some electronic financial services, the central network station 102 causes funds to move among and between deposit accounts associated with various ones of the network users and a deposit account associated with the central network station 102 maintained at a financial institution (FI) 120. Additionally, other types of accounts are often used to move funds, such as stored value accounts and credit accounts.

Each of the user network stations 110-116 communicates with the central network station 102 via a communication link 130, 132, 134, 136 and 138. A communication link can be established via, but is not limited to, conventional dial-up phone service, wireless phone service, including digital, analog and hybrid systems, an intranet, an extranet, a LAN, a WAN, and the Internet. Additionally, two or more of the user network stations 110-116 often communicate directly with one another via a communication link. For example, as shown in FIG. 1A, user network stations 110 and 112 communicate with one another via communication link 140. Communications between a user network station and the central network station, as well as between user network stations, can be made in several forms. They can be real-time communications, also known as in-session communications, they can be made by asynchronous messaging, or they can be made by asynchronous batch file transmission and processing.

Oftentimes two or more user network stations communicate with one another via the central network station. For example, user network stations 114 and 116 communicate with one another via communication links 134 and 136, with the communications traveling through the central network station 102. The communications between user network stations are often the basis of the financial transactions and/or services performed or facilitated by the central network station 102. These communications include purchase agreements, investment agreements, as well as other agreements relating to financial matters. It should also be noted that communications between network users not made via user network stations can also be the basis of the financial transactions and/or services performed or facilitated by the central network station 102. Network users include, but are not limited to, individuals, businesses, educational institutions, and other organizations.

Figure 1B:
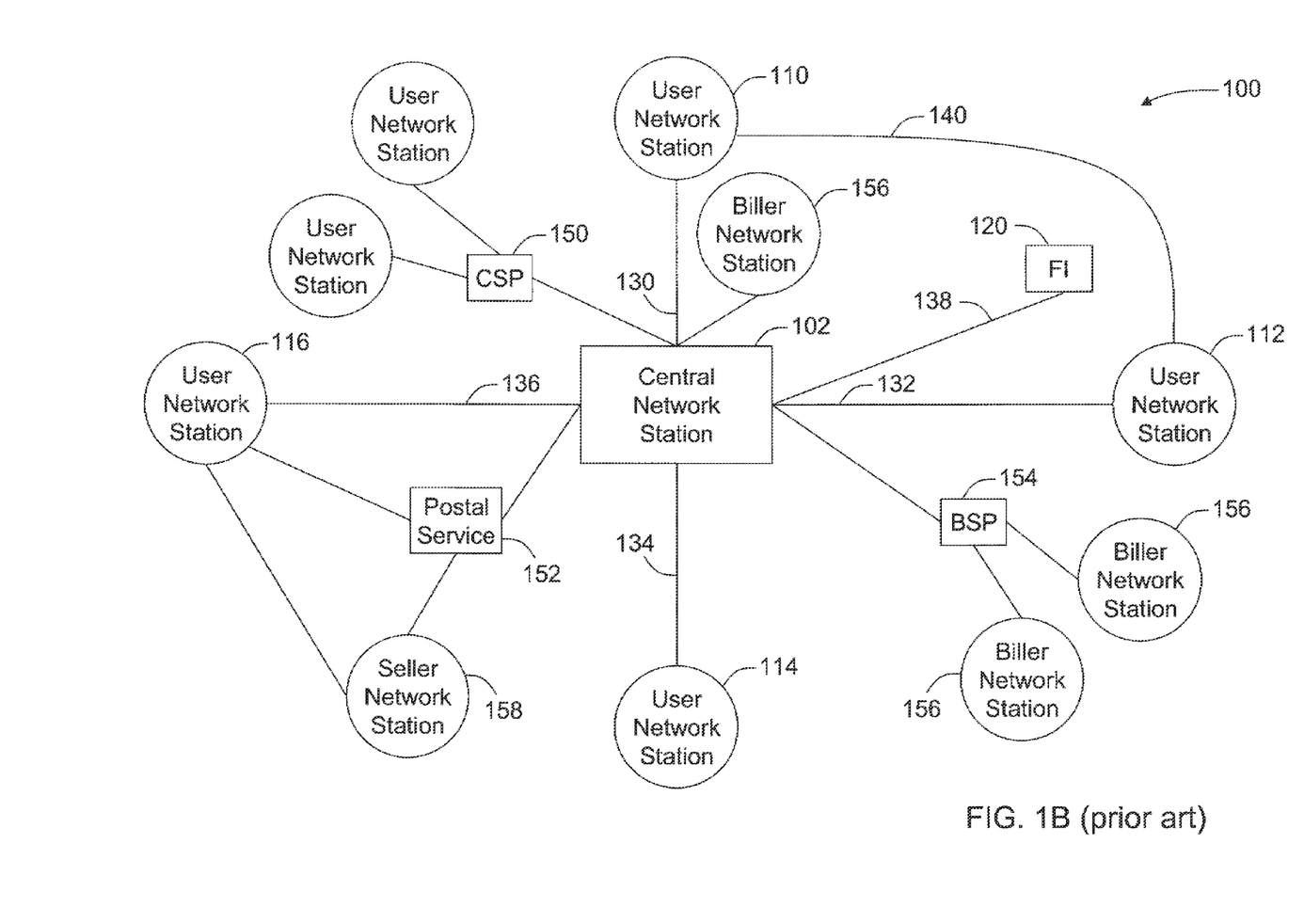
FIG. 1B is a further depiction of the conventional electronic financial service system shown in FIG. 1A.

FIG. 1B is a further depiction of the conventional electronic financial service network 100 of FIG. 1A. FIG. 1B shows additional participants often found in conventional electronic financial service networks, as well as communication links between and among the additional and prior depicted network participants. It should be understood that not all conventional electronic financial service networks include each of the types of participants depicted in FIG. 1B. Furthermore, not all electronic financial service networks provide the same services. The exemplary electronic financial service network 100 includes a consumer service provider 150 (CSP), a postal service 152, a biller service provider 154 (BSP), additional user network stations, multiple biller network stations 156, and a seller network station 158. It will be appreciated that a biller and a seller are each network users. Furthermore, network stations associated with billers and sellers are, for clarity, labeled biller network stations and seller network stations to highlight their associated network user's roles in the electronic financial service network 100. It also will be appreciated that a given network user could have multiple roles. That is, a biller could also be a payer, and so on.

A consumer service provider 150 provides interface access to the central network station 102, and thus network 100, for some network users. A bank or other financial or investment institution is often a consumer service provider. A CSP is also known as a portal. Additionally, a CSP can also offer services to a network user beyond those offered by the central network station 102. Oftentimes the central network station 102 operates behind the scenes in relation to CSP 150. That is, the central network station 102 provides the functionality to provide and/or facilitate financial transactions and/or services, while CSP 150 controls the presentation of such functionality to a network user.

Billers, who access network 100 through biller network stations 156, often electronically present their customer's bills or invoices for services rendered and/or products sold. The central network station 102 typically receives billing information from billers and then presents either summary or complete billing information to payers. Billers also often receive remittance advice via network 100 for payment of bills, both those presented via network 100, and those only paid via network 100. A biller's access to the central network station 102 is sometimes through a BSP 154 which processes bills for several billers.

The FI 120, introduced above, provides access to at least one financial institution network, including the Automated Clearing House (ACH) network or FEDWIRE network, for financial transactions performed or facilitated by the central network station 102. FI 120 also hosts at least one deposit account associated with network 100. The financial institution also provides other services for the network 100, including settlement and treasury functions. As shown in FIG. 1B, central network station 102 also directly accesses other type financial networks. These networks include credit card networks and ATM/POS networks.

A postal service 152 performs delivery of goods purchased by network users and tracks the movement of these goods. This service could be provided in concert with central network station 102. A postal service is a participant in payment-on-delivery transactions.

Introduced above, the central network station 102 causes movement of funds between and among deposit accounts. These movements of funds are either by paper movement or electronic movement. Paper movement of funds includes checks and drafts prepared under the direction of the central station 102. These checks or drafts may be drawn on an account associated with the central network station 102 and payable to a payee designated by a network user. Or, these checks or drafts may be drawn on an account maintained at a financial institution associated with a network user and payable to a payee designated by a network user or deposited into an account associated with the central network station 102.

Electronic movement of funds is also by direction of the central network station 102. As introduced above, the central network station 102 is associated with a financial institution 120 that performs electronic movement of funds on behalf of the central network station 102. Like paper movement of funds, electronic movement of funds may originate from an account associated with the central network station 102, or may originate from an account associated with a network user. A network user must provide account information to the central network station 102 so that the central network station 102 can access that network user's account, whether the access is electronic or paper.

Some electronic financial service networks are closed systems. In a closed system, funds only move among and between individuals or entities that have a pre-established relationship with the central network station of the respective network. Additionally, information typically flows exclusively electronically in closed systems. Individuals and entities with pre-established relationships with a central network station are known as registered users. In these closed systems, funds can move either electronically or by paper, though preferably electronically. Other electronic financial service networks are open systems. In an open system, funds can move not only among and between registered users, but also to unregistered recipients. For movement to an unregistered recipient, funds must move by paper methods, as a central network station directing the transaction does not have access to the recipient's account.

It will be recognized by one skilled in the art that electronic movement of funds is more efficient than paper movement of funds. This efficiency arises because of at least two reasons. First, the cost per transaction is less for electronic movement than paper movement. Second, electronic movements require less time to complete than paper movements. Likewise, it will be recognized that electronic movement of information is also more efficient than paper movement of information.

Figure 2:
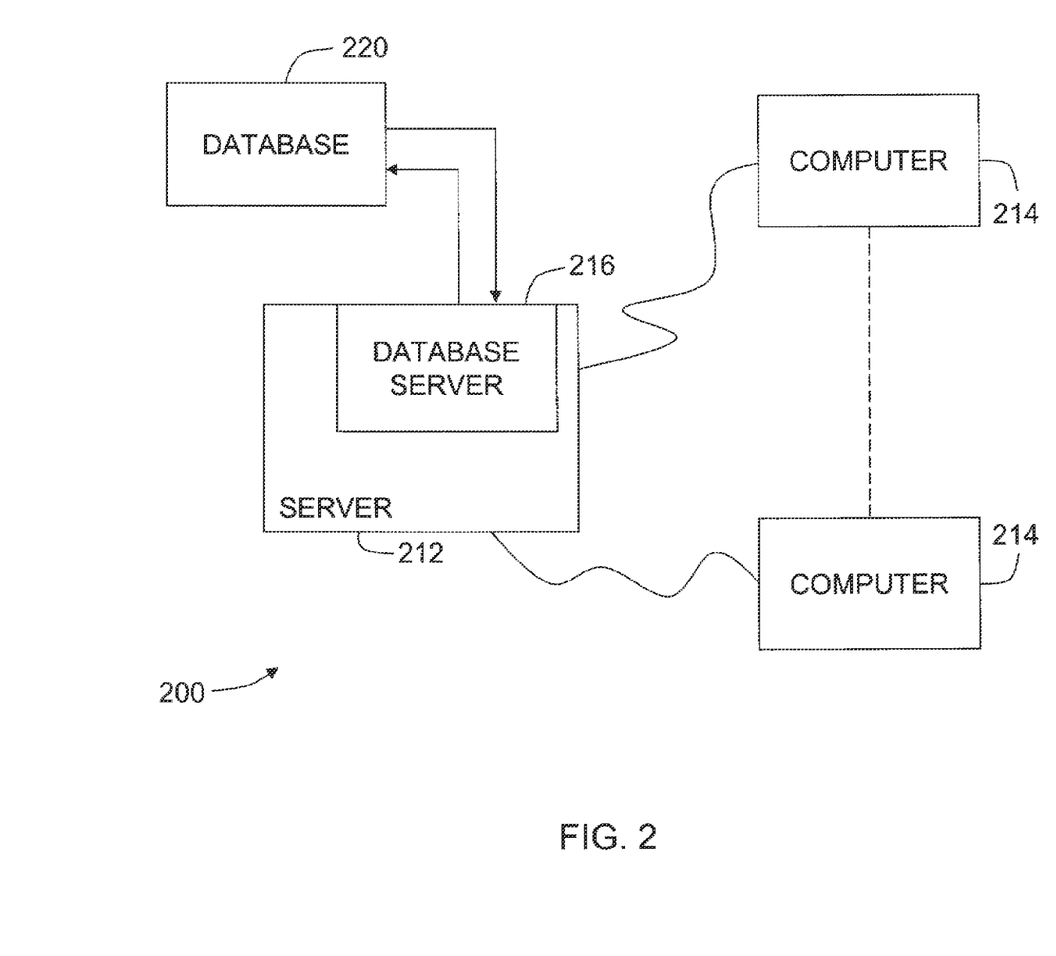
FIG. 2 is a simplified block diagram of an exemplary embodiment of a server architecture of a system in accordance with one embodiment of the present invention.

FIG. 2 is a simplified block diagram of an exemplary system 200 in accordance with one embodiment of the present invention. In one embodiment, system 200 is similar to the electronic financial service network 100 shown in FIGS. 1A and 1B with certain enhancements directed to the electronic processing of financial transactions having an exception payment included therewith in order to affect payment of a bill. More specifically, in the example embodiment, system 200 includes a server system 212, and a plurality of client sub-systems, also referred to as client systems 214, connected to server system 212. System 200 is sometimes referred to as the RPPS® (Remote Payment and Presentment Service) system or the payment system. (RPPS is a registered trademark of MasterCard International Incorporated.) In one embodiment, client systems 214 are computers including a web browser, such that server system 212 is accessible to client systems 214 using the Internet. Client systems 214 are interconnected to the Internet through many interfaces including a network, such as a local area network (LAN) or a wide area network (WAN), dial-in-connections, cable modems and special high-speed ISDN lines. Client systems 214 could be any device capable of interconnecting to the Internet including a web-based phone, personal digital assistant (PDA), or other web-based connectable equipment. A database server 216 is connected to a database 220 containing information on a variety of matters, as described below in greater detail. In one embodiment, centralized database 220 is stored on server system 212 and can be accessed by potential users at one of client systems 214 by logging onto server system 212 through one of client systems 214. In an alternative embodiment, database 220 is stored remotely from server system 212 and may be non-centralized.

As discussed below, a biller directory and/or other consumer related data including data utilized and processed by the billers can be stored within database 220. For example, the biller directory may include a list of billers registered to receive exception payments electronically, a format or structure of consumer account related information that is acceptable for each biller (also referred to herein as an account mask or billing account structure) for processing payments electronically, exception masks associated with the registered billers if required by the particular biller, a list of consumer accounts that are registered for electronic processing of exception payments, and other consumer related information such as names of the consumers, addresses and telephone numbers, other consumer identifiers, account numbers and payment histories. Other data may also be stored within database 220 including exception payment batch files. In addition, similar data or other billing and consumer related data may also be stored within other databases such as a database associated with billers and/or a database associated with originators.

The embodiments illustrated and described herein as well as embodiments not specifically described herein but within the scope of aspects of the invention constitute exemplary means for the electronic processing of financial transactions, and more particularly, constitute exemplary means for the electronic processing of financial transactions having an exception payment included therewith in order to affect payment of a bill. For example, the server system 212 or the client system 214, or any other similar computer device, programmed with computer-executable instructions illustrated in FIG. 2 constitutes exemplary means for the electronic processing of financial transactions having an exception payment included therewith in order to affect payment of a bill.

Figure 3:
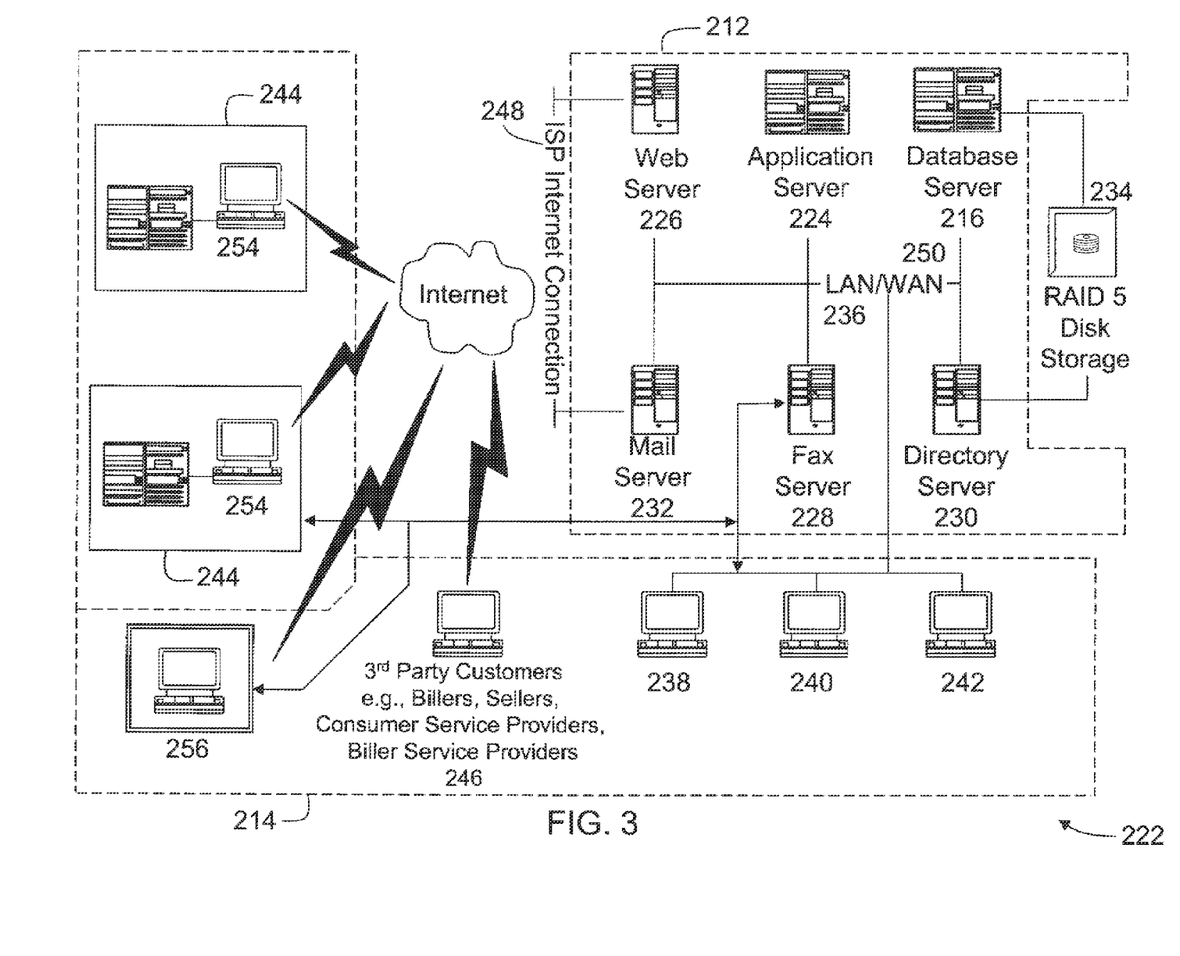
FIG. 3 is an expanded block diagram of an exemplary embodiment of a server architecture of a system in accordance with one embodiment of the present invention.

FIG. 3 is an expanded block diagram of an exemplary embodiment of a server architecture of a payment system 222 in accordance with one embodiment of the present invention. Components in system 222, identical to components of system 200 (shown in FIG. 2), are identified in FIG. 3 using the same reference numerals as used in FIG. 2. System 222 includes server system 212 and client systems 214. Server system 212 further includes database server 216, an application server 224, a web server 226, a fax server 228, a directory server 230, and a mail server 232. A disk storage unit 234 is coupled to database server 216 and directory server 230. Servers 216, 224, 226, 228, 230, and 232 are coupled in a local area network (LAN) 236. In addition, a system administrator's workstation 238, a user workstation 240, and a supervisor's workstation 242 are coupled to LAN 236. Alternatively, workstations 238, 240, and 242 are coupled to LAN 236 using an Internet link or are connected through an intranet.

Each workstation, 238, 240, and 242 is a personal computer having a web browser. Although the functions performed at the workstations typically are illustrated as being performed at respective workstations 238, 240, and 242, such functions can be performed at one of many personal computers coupled to LAN 236. Workstations 238, 240, and 242 are illustrated as being associated with separate functions only to facilitate an understanding of the different types of functions that can be performed by individuals having access to LAN 236.

Server system 212 is configured to be communicatively coupled to various individuals, including employees 244 and to third parties, e.g., billers, sellers, biller service providers and/or consumer service providers, 246 using an ISP Internet connection 248. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 250, local area network 236 could be used in place of WAN 250.

In the exemplary embodiment, any authorized individual having a workstation 254 can access system 222. At least one of the client systems includes a manager workstation 256 located at a remote location. Workstations 254 and 256 are personal computers having a web browser. Also, workstations 254 and 256 are configured to communicate with server system 212. Furthermore, fax server 228 communicates with remotely located client systems, including a client system 256 using a telephone link. Fax server 228 is configured to communicate with other client systems 238, 240, and 242 as well.

Described in detail herein are exemplary embodiments of systems and processes that facilitate electronic processing of financial transactions that include an exception item to affect payment of a bill. The systems and processes facilitate, for example, electronic submission of information using a client system, automated extraction of information, and web-based reporting for internal and external system users. A technical effect of the systems and processes described herein include at least one of (a) providing originators with an option of sending exception payments electronically using the payment system for faster posting and receipt of funds; (b) providing billers with an option of receiving exception payments electronically using the payment system for faster posting and receipt of funds; (c) storing the billers choosing to receive exception payments electronically and associated exception masks, if applicable, for use with exception payments; (d) determining by an originator whether an electronic bill payment entered by a consumer is an exception payment, and whether a corresponding exception mask is satisfied; (e) creating an exception data file including an exception addenda record to the exception payment including at least one of the consumer's first name, the consumer's address, the consumer's telephone number, and other consumer identifier; (f) transmitting the exception payment along with the corresponding exception addenda record to at least one of the biller and biller service provider; (g) matching the received exception payment and corresponding exception addenda record to consumer data stored for the biller; (h) posting the exception payment for the biller; (i) creating for the biller a non-financial return with an addenda record which contains corrected account information; (j) transmitting the non-financial return with the addenda record to the originator to update their files to correct future recurring payments by the consumer; and (k) updating the consumer payment information with the correct account number by the originator.

As used herein, an originator includes any entity providing a consumer with a service to facilitate on-line bill payment. For example, an originator may include a financial institution such as a bank or a third-party entity used by a bank for processing on-line payments for consumers. An originator may also include or be referred to as a consumer service provider (CSP). A biller is typically a merchant or an entity that provides a good or service to a consumer. A biller service provider is an entity that provides a biller with a service to allow the biller to receive bill payments. In some cases, a biller can also serve as a biller service provider for themselves or other billers. Accordingly, as used herein, in at least some cases the biller and the biller service provider can be the same entity.

In an alternative embodiment, some or all of the tasks described above as being performed by the originator, the biller service provider and/or the biller are performed by payment system 200. For example, in an alternative embodiment, the originators and billers opting to use the payment system (i.e., sending and receiving exception payments electronically) are stored within the payment system along with any associated exception masks. In addition, the payment system may determine whether an electronic bill payment entered by a consumer is an exception payment and whether a corresponding exception mask is satisfied, create an exception addenda record to the exception payment including at least one of the consumer's first name, address and telephone number, match the exception payment and corresponding exception addenda record to consumer data stored for the biller, post the exception payment for the biller on the biller system, create a non-financial return with an addenda record which contains corrected account information, and update the consumer payment information with the correct account number by the originator.

In at least some known electronic bill payment systems, payments are originated by a bill payment service provider, which is also known as an originator. These payments may be fulfilled either via an electronic transaction or via a paper check. The determination of whether a bill payment is fulfilled electronically or via check is based on the data the consumer enters for the payment. If the data entered matches billing data (account masks, remittance address, check digit routine) provided by a biller and are reflected on a biller directory provided to the bill payment service provider, then the payment can be fulfilled electronically by the bill payment service provider (originator). If the data entered by the consumer does not match the billing data provided by the biller and stored on the biller directory, an originator will have to create a paper check containing the consumer entered data for the payment method. The paper check is then provided to the biller or the biller's service provider.

It should be noted that originators prefer to fulfill transactions electronically for several reasons. First, it is a lower cost fulfillment method. Typically, an electronic fulfillment method costs the originator $0.10 or less, while a paper check will cost them $0.40-$0.50 per item. Secondly, the payment is posted more quickly if it is fulfilled electronically, which leads to greater customer satisfaction. The originator is typically any entity that provides a consumer with a service to facilitate on-line bill payment. For example, an originator may include a financial institution such as a bank or a third-party entity used by a bank for processing on-line payments for consumers.

As more and more consumers pay their bills on-line using bill payment services, billers are receiving more and more paper check items. As a matter of background, a biller may consider any check payment generated through an on-line banking service as an exception item as the payment does not include remittance advice, coupon or payment stub. These on-line payments typically do not flow through the biller's traditional lockbox remittance processing system and require manual intervention to post correctly. Therefore, these on-line payments can be considered an exception item or an exception payment.

The systems and processes described herein enable billers to electronically receive payment for these types of exception items, even if the consumer entered data is not an exact match to the criteria the biller provides for valid electronic payments. In other words, the systems and process described herein enable billers to electronically receive payment in those cases where the consumer entered payment data does not match the account mask required by the biller for accepting such a payment. The RPPS payment system 200 enables billers to elect to receive payments considered to be exception items in an electronic format as opposed to a paper check. System 200 will expedite biller's receipt of funds and ability to post their consumer's payment more quickly, providing operational efficiencies and improved customer satisfaction.

In the example embodiment, a RPPS biller directory contains a list of electronic billers and their accompanying payment data. If the payment data provided by the originator meets the data requirements outlined in the biller directory, RPPS system 200 will process, route and settle the payment electronically. The biller directory is stored on payment system 200. For example, the biller directory may be stored on database 220. In one embodiment, the biller directory is downloaded from payment system 200 to a computer system associated with the originator. In another embodiment, the biller directory is stored at payment system 200 and the originator system retrieves information from the biller directory as needed.

If the consumer entered data is not an exact match (i.e., does not match account information listed or does not match the account mask required by the biller), RPPS system 200 will provide for either a separate biller directory download that will contain the billers that have elected to receive electronic exception payments and associated exception masks or an additional indicator in the existing biller directory with accompanying exception masks. In an alternative embodiment, an originator using RPPS system 200 may choose to provide their full payment file to RPPS system 200 for RPPS system 200 to determine which payments can be processed electronically. RPPS system 200 will require that the originator include payor/consumer information, including at least one of consumer's name, consumer's address, consumer's telephone number, and other consumer identifier. In at least some cases, the originator has the option of including the consumer's telephone number. This consumer information will allow billers to research the account to which the exception payment should be posted. RPPS system 200 may display full payor information, if collected, on a Payments Center screen generated by the system. RPPS system 200 will receive, route and settle these electronic exception payments in a manner similar to current processes. In addition, payment receivers may be able to search for and export a file from the Payments Center screen of electronic exception payments for payment research and posting purposes.

As used herein, an exception mask is a minimum criterion or criteria that a biller requires in order to agree to accept an exception payment electronically from a consumer. For example, an account number for a biller may include ten (10) digits with the first two digits being alpha and the last eight digits being numeric, and therefore, the biller may require the exception mask to be that the first two alpha digits are correctly entered and at least four of the last eight numeric digits are correctly entered before the biller will accept payment electronically as an exception payment. In the example embodiment, a biller is not required to establish exception masks. In other words, a biller is not required to have a minimum criterion or criteria (i.e., a minimum amount of correctly inputted consumer information) before accepting an exception payment electronically, but rather a biller not requiring an exception mask will accept an exception payment electronically without conditions or requirements on the amount or type of information correctly inputted by the consumer.

In contrast, an account mask is a format or structure of consumer account related information that is acceptable for a biller for processing payments electronically. For example, an account mask or structure for a biller may include ten (10) digits with the first two digits being alpha and the last eight digits being numeric. In this case, when a consumer enters information to make an electronic payment and enters their consumer account number, the system compares the consumer entered account number to the account mask for the biller to determine whether the structure of the entered account number matches the account mask. If so, the payment is processed electronically. If there is not a match, then the payment may be designated as an exception payment for further processing including determining whether an exception mask, if applicable, is satisfied.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

Figure 4:
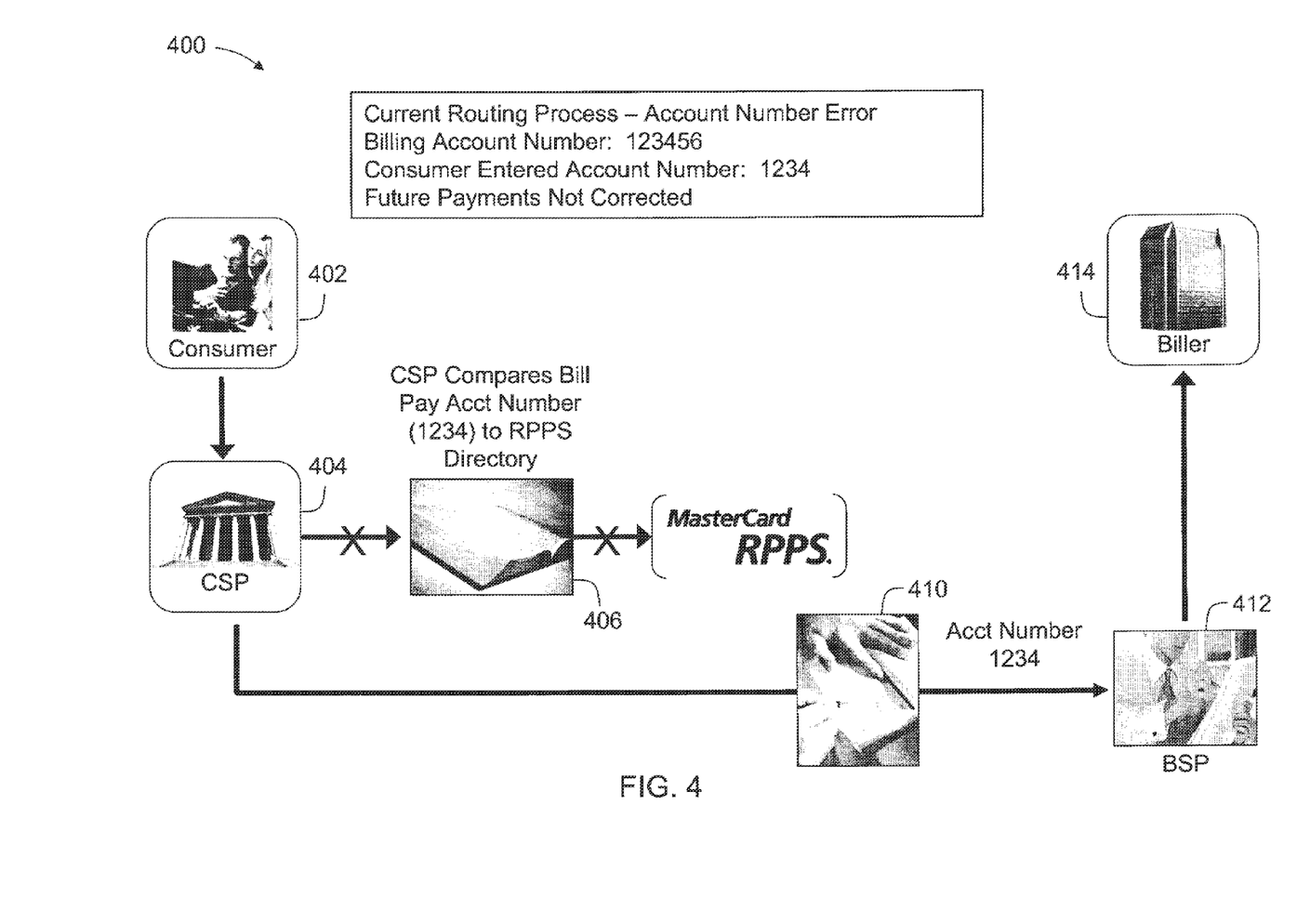
FIG. 4 is a flowchart illustrating a known process for processing an electronic exception payment.

FIG. 4 is a flowchart 400 illustrating a known process for processing an electronic exception payment. The exception payment shown in flowchart 400 includes the situation where a consumer incorrectly enters an account number into an on-line bill payment system. For example, flowchart 400 shows the consumer electronically paying 402 a bill by entering billing data including a billing account number into the on-line bill payment system. In the example shown, the consumer incorrectly enters the billing account number as 1234, when the actual billing account number is 123456. The incorrectly entered billing data is transmitted 404 to a consumer service provider (CSP), which is also sometimes referred to as an originator. An originator is an entity that provides a consumer with a service to allow the consumer to make on-line bill payments.

The CSP then compares 406 the entered billing data including the incorrectly entered billing account number to the biller directory, also known as the RPPS Directory. In the example shown in FIG. 4, since the entered billing account number (e.g., 1234) does not match an account number, or in an alternative embodiment does not match a required account mask, stored in the biller directory, the originator cannot electronically process or pay the bill, but rather must route 410 the payment containing incorrect account data to the biller or biller service provider via a check.

As used herein, a biller is typically a merchant or an entity that provides a good or service to a consumer. A biller service provider is an entity that provides a biller with a service to allow the biller to receive bill payments. In some cases, a biller can also serve as a biller service provider for themselves or other billers. Accordingly, as used herein, in at least some cases the biller and the biller service provider can be the same entity.

The originator routes 410 the payment containing incorrect account data to the biller via a check. Specifically, the check is routed 412 to a biller service provider (BSP) and then routed 414 to the biller. The payment is then processed and posted for the biller within the consumer's account.

Figure 5:
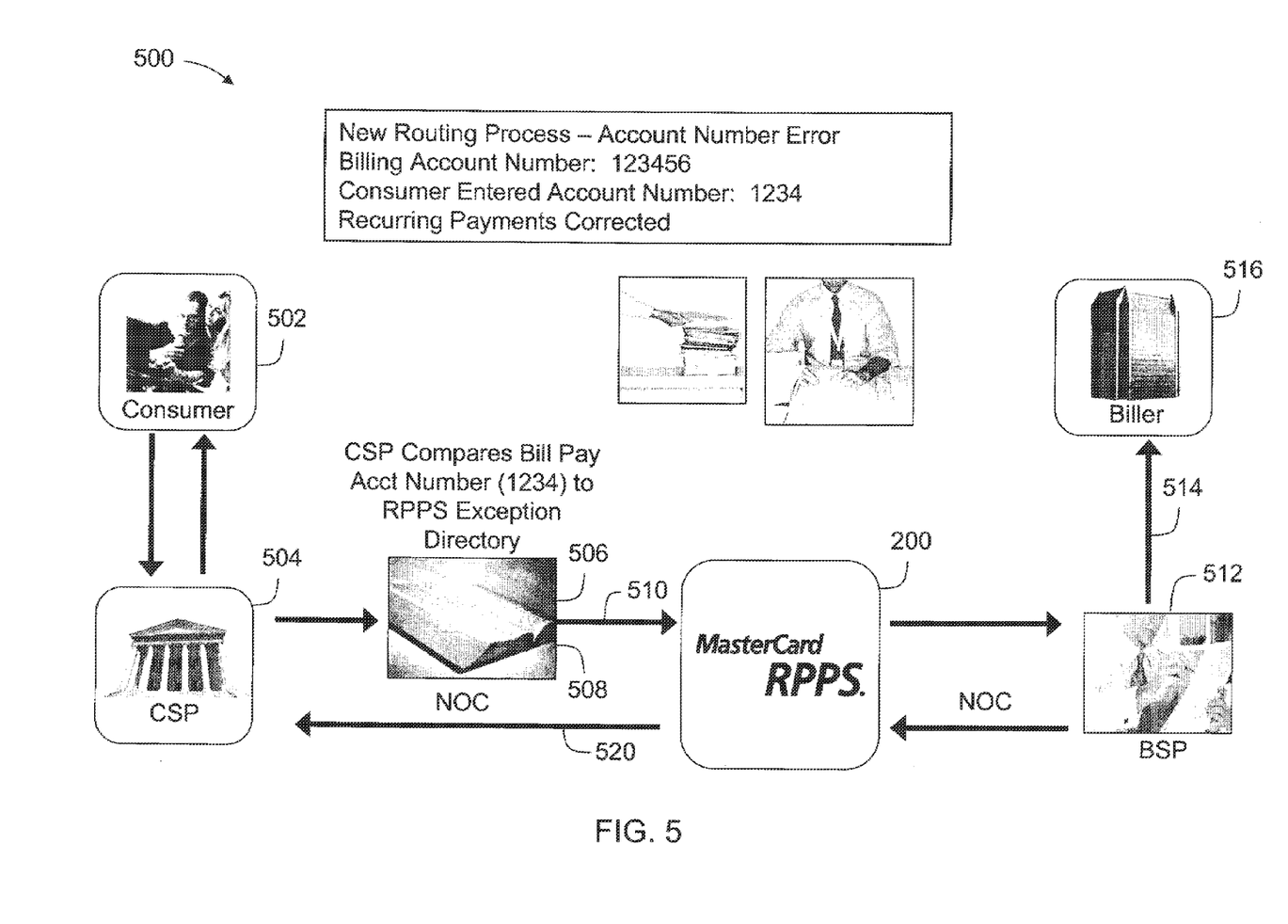
FIG. 5 is a flowchart illustrating exemplary processes utilized by the system shown in FIG. 2 for processing an electronic exception payment.

FIG. 5 is a flowchart 500 illustrating exemplary processes utilized by system 200 (shown in FIG. 2). System 200 is sometimes referred to as the payment system or the RPPS system. In the example embodiment, system 200 may be utilized by a consumer, a consumer service provider (also known as an originator), a biller service provider and a biller. The technical effect of the processes and systems described herein is achieved when billers, such as merchants, register with system 200 for electronically receiving exception payments. Upon signing up to receive exception payments, a biller provides system 200 with exception masks, in those cases where a biller requires an exception mask, for storage within the system, indicates that they are able to receive exception payments, and indicates that they are able to generate a notification of change (NOC). In addition, originators may also sign up to send exception payments electronically through payment system 200.

Flowchart 500 illustrates an example process of electronically paying a bill that includes an exception payment. As shown in FIG. 4, the exception payment shown in flowchart 500 includes the situation where a consumer incorrectly enters an account number into the on-line bill payment system. For example, flowchart 500 shows the consumer electronically paying 502 a bill by entering billing data including a billing account number into the on-line bill payment system. In the example shown, the consumer incorrectly enters the billing account number as 1234, when the actual billing account number is 123456. The incorrectly entered billing data is transmitted 504 to a consumer service provider (CSP), which is also sometimes referred to as an originator. The CSP then compares 506 the entered billing data including the incorrectly entered billing account number to the biller directory, also known as the RPPS Directory. In one embodiment, the CSP downloads the biller directory from system 200 for storage on a computer system at the CSP such that the CSP is able to perform the comparison. In another embodiment, the CSP computer system accesses the biller directory stored on system 200 to retrieve data as needed, or the CSP provides data to system 200 such that system 200 performs the comparison for the CSP and provides the results back to the CSP.

In the example shown in FIG. 5, the originator determines that the entered billing account number (e.g., 1234) does not match an account number, or in an alternative embodiment does not match an account mask required by the biller, stored in the biller directory. Since the entered information does not match the stored information stored in the biller directory, the originator designates the payment as an exception payment. If the biller is registered in the biller directory for receiving exception payments and has stored exception masks within the biller directory, the originator is able to create 508 an exception payment batch file with an addenda record including at least one of a consumer first name, an address for the consumer, a telephone number for the consumer, and a consumer identifier. In the example embodiment, a consumer identifier may include a number or some other identifier that is established by an originator, a biller, a service provider or the provider of the payment system for identifying a consumer within the system. The exception payment batch file is also known as an exception data file which may include an exception addenda record. This data file is used to determine the consumer associated with the exception payment. In an alternative embodiment, system 200 determines that the entered billing account number does not match an account number stored in the biller directory based on the consumer data provided to it by the CSP, designates the payment as an exception payment, and creates an exception payment batch file with an addenda record to be provided to the biller or BSP.

Although the exception payment example described herein includes the situation wherein a consumer entered billing account number does not match an account number for the consumer stored within the biller directory, an exception payment could include any situation wherein consumer entered information for an electronic payment does not match consumer related data provided by the biller and stored within the biller directory. The data that the consumer entered information is compared to is sometimes referred to as a criterion or a criteria, which the biller requires for determining whether a bill payment is an exception payment.

In the example embodiment, the originator then electronically transmits 510 the exception payment including the exception addenda record to payment system 200, which processes the received data and then transmits the information to the biller service provider for further processing. The processing 512 at the BSP includes matching the exception addenda record to consumer files stored on behalf of the biller and determining the proper consumer account for posting the exception payment. Once the appropriate consumer associated with the exception payment is determined, the biller service provider then transmits 514 the exception payment to the biller for posting 516 to the proper consumer account.

In an alternative embodiment, system 200 includes consumer data typically stored at the biller or BSP. System 200 is therefore configured to process the exception payment including the exception addenda record and the consumer data to determine the proper consumer account for posting the exception payment. Once the appropriate consumer associated with the exception payment is determined, system 200 either transmits the information to the biller or BSP for posting into the biller accounting system, or system 200 posts the payment directly to the proper consumer account at the biller.

In the case where the appropriate consumer cannot be determined by the BSP or the biller, the exception payment is returned to the CSP.

In the example embodiment, after an exception payment is electronically received by the biller, the biller or the biller service provider will then create a non-financial return file with addenda record indicating the correct account information for the received exception payment. A notification of correction (NOC) is then transmitted 520 from the biller service provider to the consumer service provider for storage within system 200 at the biller directory. The NOC is used by the consumer service provider for automatically correcting future payments by the consumer. In other words, the NOC is utilized by the consumer service provider so future occurrences of payments by the consumer can be routed correctly.

In an alternative embodiment, the NOCs are stored within system 200 such that future exception payments that have a previously generated NOC are quickly processed at system 200 without having to perform any further research. In other words, RPPS system 200 stores the corrected account numbers received from the biller along with the NOC so that any future payments that come from the originator can be automatically corrected by system 200 without having to access the biller or BSP, which improves processing time and reduces expenses. In another embodiment, consumer data files used by billers are stored within system 200 such that the NOCs can be generated by system 200 without having to perform the search and comparison at the biller or BSP.

In another embodiment, the biller or the BSP can access a Payments Center application stored on RPPS system 200, which enables the biller or BSP to directly enter corrected account numbers based on the received exception addenda records. Accordingly, under this embodiment, the biller or BSP does not have to create the non-financial return files with addenda record for correcting the account information for the received exception payments. Rather, the account information is corrected directly within the Payments Center application of system 200 by the biller or BSP.

The systems and processes described herein enable billers to electronically receive payment for these types of exception items, even if the consumer entered data is not an exact match to the criteria the biller provides for valid electronic payments. The RPPS system enables billers to elect to receive payments considered to be exception items in an electronic format as opposed to a paper check. The system will expedite biller's receipt of funds and ability to post their consumer's payment more quickly, providing operational efficiencies and improved customer satisfaction.

The systems and processes described herein show a consumer inputting information into a computer system which is then transmitted over a network to a CSP. However, another embodiment includes the use of a third party, ATM (Automated Teller Machine), or KIOSK for entering information for a consumer. For example, a consumer can use a third party (e.g., Western Union) to input and process a payment for the user. This is sometimes referred to as a walk-in payment provider. In this case, the third party is essentially a CSP that is entering the consumer's payment data directly into the system in order to electronically pay a bill for the consumer. In another embodiment, an ATM can be configured to receive and send bill payments including exception payments entered by a consumer. When using an ATM in this manner, the ATM essentially acts as the CSP. In another embodiment, a KIOSK can be configured to enable a user to enter bill payment information including an exception payment that is then transmitted for processing. In these embodiments, the bill payment information and the determination as to whether it is an exception payment is processed in the same way as described herein.

Figure 6:
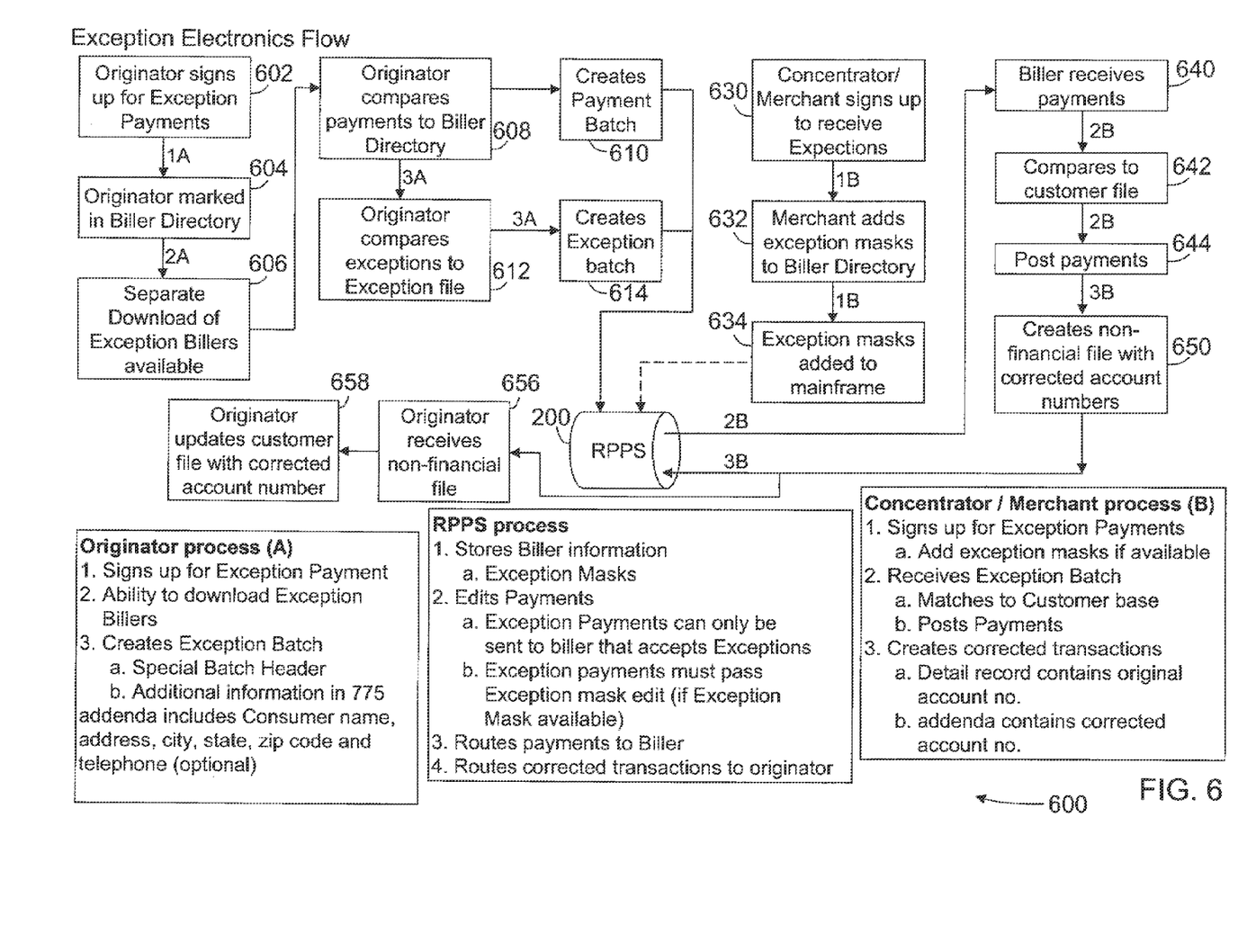
FIG. 6 is a more detailed flowchart illustrating exemplary processes utilized by the system shown in FIG. 2 for processing an electronic exception payment.

FIG. 6 is a more detailed flowchart 600 illustrating exemplary processes utilized by system 200 (shown in FIG. 2). In the example embodiment, an originator, also known as a consumer service provider, registers 602 within system 200 for processing exception payments electronically. The registration of each originator is stored 604 within the biller directory. In order to register for exception payments, an originator must be able to receive 606 a separate download of each exception biller available to the system.

After registering for receiving exception payments, an originator receives data relating to an on-line payment made by a consumer. The originator compares 608 the payment data entered by the consumer to the biller directory stored within the system. If the payment data matches data stored within the biller directory, then the system creates 610 a payment batch file, which is then stored within the RPPS system 200 for further processing. However, if the payment data entered by the consumer does not match the data stored within the biller directory, then the originator designates the payment as an exception payment and then prompts the system to compare 612 the data associated with the exception payment to exception files stored within the biller directory.

For example, if a consumer incorrectly enters an account number into the on-line bill payment system, the consumer service provider will determine that incorrect information has been entered by comparing the account number to the biller directory and will designate the payment as an exception payment. If the biller is registered in the biller directory for receiving exception payments and has stored exception masks within the biller directory, the consumer service provider then creates 614 an exception payment batch file with an addenda record including at least one of a consumer first name, an address for the consumer, a telephone number for the consumer, and a consumer identifier. The exception payment batch file is stored within the RPPS system 200 for further processing.

FIG. 6 also shows the biller, also known as a merchant or concentrator, registering 630 with system 200 for receiving exception payments, providing 632 exception masks to system 200 for storage within the biller directory, and adding 634 exception masks to biller computer (e.g., mainframe). The exception masks are used for processing exception payments.

After the consumer service provider creates an exception payment batch file with an addenda record including at least one of a consumer first name, an address for the consumer, a telephone number for the consumer, and a consumer identifier, the system electronically transmits the exception payment including the exception addenda record to the biller service provider. The biller receives 640 exception payment batch file, compares 642 to consumer file stored by the biller, determines the proper consumer account for posting the exception payment, and posts 644 the exception payment to the proper consumer account to show payment has been made.

After an exception payment is received by the biller, the biller or the biller service provider creates 650 a non-financial return file with addenda record indicating the correct account information for the received exception payment. The non-financial return file with addenda record is also known as a notification of correction (NOC). The NOC is transmitted to the consumer service provider and stored within system 200. The consumer service provider receives 656 the NOC, and then updates 658 the consumer file with the information included within the NOC such as updating the consumer file stored within system 200 with the corrected account number for the consumer.

The NOC is used by the consumer service provider for automatically correcting future payments by the consumer. In other words, the NOC is utilized by the consumer service provider so future occurrences of payments by the consumer can be routed correctly.

In the example embodiment, a method for electronically processing a financial transaction including an exception payment is provided. The exception payment includes payments made by a consumer using an on-line computer system wherein consumer entered information does not match a criterion provided by a corresponding biller for accepting electronic payment. The method uses a computer system coupled to a database. The method includes (a) providing originators with an option of sending exception payments electronically for faster posting and receipt of funds; (b) providing billers with an option of receiving exception payments electronically for faster posting and receipt of funds; (c) storing the billers choosing to receive exception payments electronically and associated exception masks, if applicable, for use with exception payments; (d) determining by an originator whether an electronic bill payment entered by a consumer is an exception payment, and whether a corresponding exception mask is satisfied; (e) creating an exception addenda record to the exception payment including at least one of the consumer's first name, consumer's address, consumer's telephone number, and a consumer identifier; (f) transmitting the exception payment along with the corresponding exception addenda record to at least one of the biller and biller service provider; (g) matching the received exception payment and corresponding exception addenda record to consumer data stored for the biller; (h) posting the exception payment for the biller; (i) creating for the biller a non-financial return with an addenda record which contains corrected account information; (j) transmitting the non-financial return with the addenda record to the originator to update their files to correct future recurring payments by the consumer; and (k) updating the consumer payment information with the correct account number by the originator.

A network-based system for electronically processing a financial transaction including an exception payment is also provided. The system includes a client or remote computer system comprising a browser, a database for storing consumer related information, and a payment computer system configured to be coupled to the client system and the database. The payment computer system is further configured to (a) prompt an originator to elect to send exception payments electronically for faster posting and receipt of funds; (b) prompt a biller to elect to receive exception payments electronically for faster posting and receipt of funds; (c) store the billers electing to receive exception payments electronically in the database and associated exception masks, if applicable, for use with exception payments; (d) determine by an originator whether an electronic bill payment entered by a consumer is an exception payment, and whether a corresponding exception mask is satisfied; (e) generate and apply an exception addenda record to the exception payment including at least one of the consumer's first name, consumer's address, consumer's telephone number, and a consumer identifier; (f) transmit the exception payment along with the corresponding exception addenda record to at least one of the biller and biller service provider; (g) match the received exception payment and corresponding exception addenda record to consumer data stored for the biller; (h) post the exception payment for the biller; (i) create for the biller a non-financial return with an addenda record which contains corrected account information; (j) transmit the non-financial return with the addenda record to the originator to update their files to correct future recurring payments by the consumer; and (k) update the consumer payment information with the correct account number by the originator.

In another embodiment, a computer and a computer program are provided which are configured or programmed to perform steps similar to those already recited herein.

The systems and processes described herein enable billers to electronically receive payment for these types of exception items, even if the consumer entered data is not an exact match to the criteria the biller provides for valid electronic payments. The RPPS system enables billers to elect to receive payments considered to be exception items in an electronic format as opposed to a paper check. The system will expedite biller's receipt of funds and ability to post their consumer's payment more quickly, providing operational efficiencies and improved customer satisfaction.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense. For example, the example embodiments described herein relate to electronic bill payment between a consumer and a biller. In at least some cases, the consumer described herein includes an individual consumer, and the biller includes a business entity. Thus, the individual consumer may use the system described herein to electronically submit a bill payment to a business entity biller. However, in another embodiment, the consumer may include a first business entity, and the biller includes a second business entity. Thus, the first business entity/consumer may use the system described herein to electronically submit a bill payment to the second business entity/biller. Accordingly, as described herein a consumer includes both an individual consumer and a business entity consumer, and the systems and processes described herein can be used in an individual consumer to business biller relationship or in a business consumer to business biller relationship.

While the invention has been described in terms of various specific embodiments, those skilled in the art will recognize that the invention can be practiced with modification within the spirit and scope of the claims.

What is claimed is:

1. A method for processing an electronic bill payment using a computer system coupled to a database, said method comprising:

receiving an exception payment at the computer system, the exception payment including an electronic bill payment submitted on behalf of a consumer having consumer-entered information not matching a criterion for accepting electronic payment required by a biller;

receiving an exception addenda record for the exception payment at the computer system, the addenda record identifying the consumer submitting the exception payment;

electronically directing a posting of the exception payment to an appropriate consumer account with the biller based on the addenda record; and providing, using the computer system, a notification of correction for automatically directing a future electronic bill payment submitted on behalf of the consumer having the same consumer-entered information to the appropriate consumer account.

2. The method in accordance with claim 1 wherein receiving an exception payment further comprises receiving an exception payment that is a recurring payment, wherein the recurring payment is an electronic bill payment automatically submitted on behalf of the consumer to the biller at a reoccurring period of time.

3. The method in accordance with claim 1 wherein receiving an exception payment further comprises receiving an exception payment having consumer-entered information including a consumer-entered account number not matching a billing account number associated with the consumer by the biller.

4. The method in accordance with claim 3 wherein receiving an exception payment further comprises receiving an exception payment having consumer-entered information satisfying a corresponding exception mask.

5. The method in accordance with claim 1 wherein receiving an exception payment further comprises receiving an exception payment that is a first recurring payment in a series of recurring payments having a consumer-entered account number not matching a billing account number associated with the consumer by the biller, and wherein providing a notification of correction further comprises storing the notification of correction within the database that automatically links the consumer-entered account number to the billing account number for future payments of the series of recurring payments made on behalf of the consumer.

6. A computer coupled to a memory device for processing an electronic bill payment, said computer programmed to:
receive an exception payment including an electronic bill payment submitted on behalf of a consumer having consumer-entered information not matching a criterion for accepting electronic payment required by a biller;

receive an exception addenda record for the exception payment, the addenda record identifying the consumer submitting the exception payment;

prompt a posting of the exception payment to an appropriate consumer account for the biller based on the addenda record; and provide a notification of correction, the notification of correction configured to automatically submit a future electronic bill payment submitted on behalf of the consumer having the same consumer-entered information as a non-exception payment for posting the future electronic bill payment to the appropriate consumer account.

7. The computer in accordance with claim 6 further programmed to receive an exception payment that is a recurring payment, wherein the recurring payment is an electronic bill payment submitted on behalf of the consumer to the biller at a reoccurring period of time.

8. The computer in accordance with claim 6 further programmed to receive an exception payment having consumer-entered information including a consumer-entered account number not matching a billing account number associated with the consumer by the biller.

9. The computer in accordance with claim 8 further programmed to receive an exception payment having consumer-entered information satisfying a corresponding exception mask.

10. The computer in accordance with claim 6 wherein the received exception payment is a first recurring payment in a series of recurring payments having a consumer-entered account number not matching a billing account number associated with the consumer by the biller, and wherein the computer is further programmed to:
store the notification of correction in the memory device, the notification of correction configured to automatically link the consumer-entered account number to the billing account number for future payments of the series of recurring payments submitted on behalf of the consumer.

11. A system for processing an electronic bill payment, said system comprising:
a memory device for storing information; and
a server system coupled in communication to an originator computer device, a biller computer device, and the memory device, said server configured to:
receive an exception payment from the originator computer device, the exception payment including an electronic bill payment submitted on behalf of a consumer having consumer-entered information not matching a criterion for accepting electronic payment required by a biller;

receive an exception addenda record for the exception payment from the originator computer device, the addenda record identifying the consumer submitting the exception payment;

direct a posting of the exception payment to an appropriate consumer account based on the addenda record by transmitting a posting message to the biller computer device; and provide a notification of correction to the biller computer device for automatically directing a future electronic bill payment submitted on behalf of the consumer having the same consumer-entered information to the appropriate consumer account.

12. One or more non-transitory computer-readable storage media having computer-executable instructions embodied thereon for processing an electronic bill payment, wherein when executed by at least one processor, the computer-executable instructions cause the processor to:
receive an exception payment including an electronic bill payment submitted on behalf of a consumer having consumer-entered information not matching a criterion for accepting electronic payment required by a biller;

receive an exception addenda record for the exception payment, the addenda record identifying the consumer submitting the exception payment;

direct a posting of the exception payment to an appropriate consumer account with the biller based on the addenda record; and provide a notification of correction for automatically directing a future electronic bill payment submitted on behalf of the consumer having the same consumer-entered information to the appropriate consumer account.

* * * * *